US009440807B2

(12) United States Patent
Herrmann et al.

(10) Patent No.: US 9,440,807 B2
(45) Date of Patent: Sep. 13, 2016

(54) NITROGEN PURGE HOPPER

(71) Applicant: EHS Solutions LLC, Peoria, IL (US)

(72) Inventors: Robert Herrmann, Princeville, IL (US); Aaron Funk, Morton, IL (US); Steven Sauder, Manhattan Beach, IL (US)

(73) Assignee: EHS Solutions LLC, Peoria, IL (US)

( * ) Notice: Subject to any disclaimer, the term of this patent is extended or adjusted under 35 U.S.C. 154(b) by 0 days.

(21) Appl. No.: 14/652,386

(22) PCT Filed: Mar. 14, 2014

(86) PCT No.: PCT/US2014/029877
§ 371 (c)(1),
(2) Date: Jun. 15, 2015

(87) PCT Pub. No.: WO2014/145161
PCT Pub. Date: Sep. 18, 2014

(65) Prior Publication Data
US 2015/0329299 A1    Nov. 19, 2015

Related U.S. Application Data

(60) Provisional application No. 61/794,748, filed on Mar. 15, 2013.

(51) Int. Cl.
*B67D 1/08*  (2006.01)
*B65G 69/20*  (2006.01)
*B65G 65/40*  (2006.01)
*B65G 69/18*  (2006.01)

(52) U.S. Cl.
CPC ............. *B65G 69/20* (2013.01); *B65G 65/40* (2013.01); *B65G 69/182* (2013.01)

(58) Field of Classification Search
CPC ..... B65G 65/40; B65G 69/20; B65G 69/182

USPC ........ 222/152, 251, 252, 163, 181.1, 153.11, 222/216, 282–285, 344, 347, 399; 414/413, 414/414
See application file for complete search history.

(56) References Cited

U.S. PATENT DOCUMENTS

| | | | | |
|---|---|---|---|---|
| 2,863,480 A * | 12/1958 | Combs | ................. | B02C 18/302 241/152.1 |
| 3,796,419 A * | 3/1974 | Werner | ..................... | C21B 7/18 414/170 |
| 5,535,920 A * | 7/1996 | Blair, Jr. | ................. | B05C 11/11 222/1 |
| 5,628,261 A * | 5/1997 | Beckstead | ............... | F23G 5/027 110/186 |
| 6,221,329 B1 * | 4/2001 | Faulkner | .................. | B07B 4/06 110/267 |
| 7,721,896 B2 * | 5/2010 | Mainwaring | ............. | B07B 1/48 209/315 |
| 8,585,341 B1 * | 11/2013 | Oren | ...................... | B65G 65/42 222/181.1 |
| 2011/0083953 A1 * | 4/2011 | Horn | ....................... | C09C 1/482 201/25 |

* cited by examiner

*Primary Examiner* — Lien Ngo
(74) *Attorney, Agent, or Firm* — Singleton Law Firm, P.C.

(57) ABSTRACT

A hopper apparatus (100) provides a conveyance passage (150) equipped with a nitrogen purge system. In operation, the hopper apparatus (100) is installed over an opening of a process vessel (200). Chemical matter may be conveyed through the conveyance passage (150) to land within the process vessel (200). The hopper apparatus may have a flap valve (141) that serves to isolate the interior space of a process vessel (200) from the ambient environment outside the process vessel (200). The hopper apparatus (100) may also inject nitrogen at various rates into the falling stream of chemical matter as it is conveyed into a process vessel (200). The hopper apparatus (100) may also provide a ventilation sleeve (180) providing ventilation and extraction of dust and vapors emitted from the falling stream of chemical matter.

8 Claims, 8 Drawing Sheets

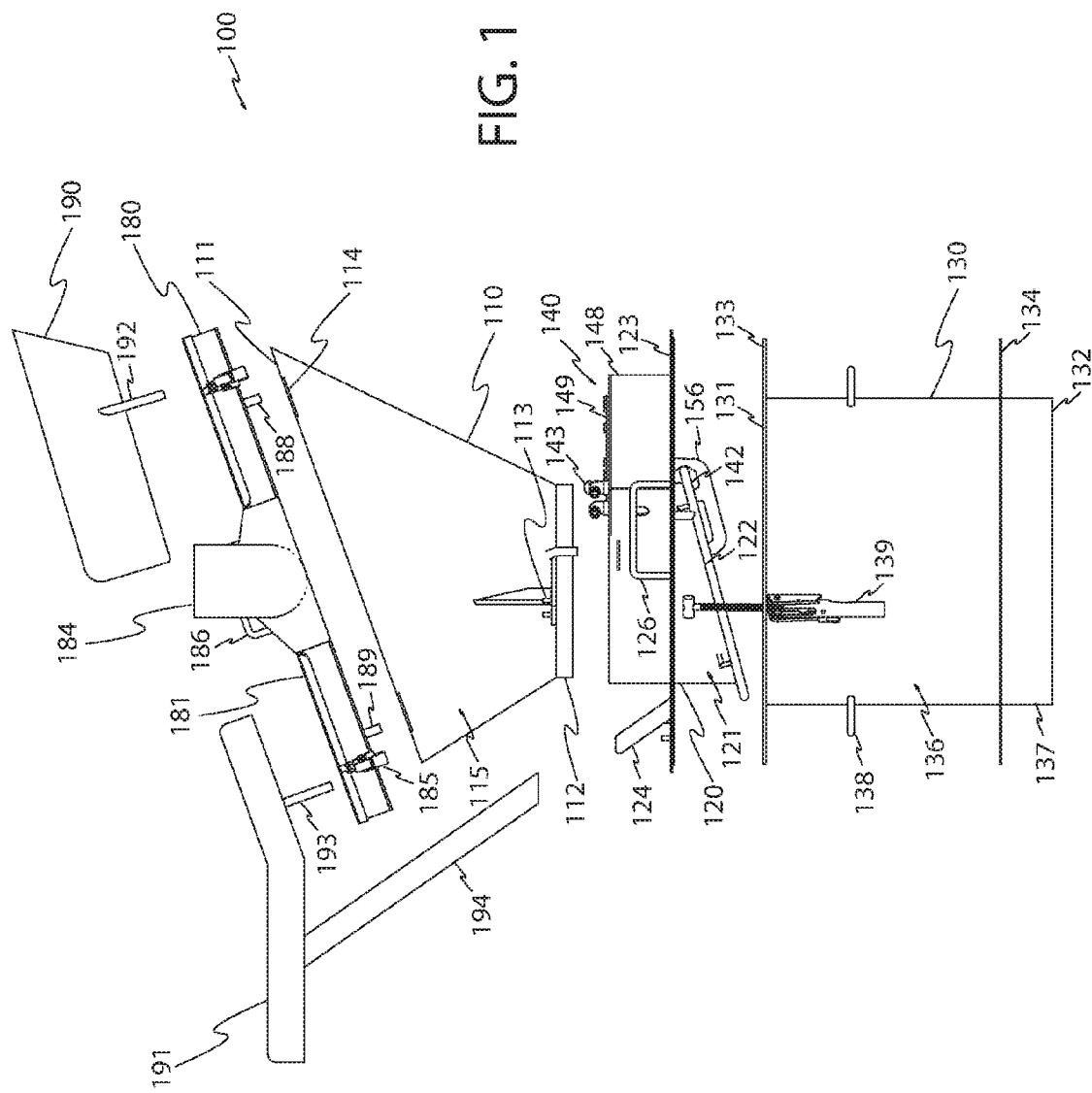

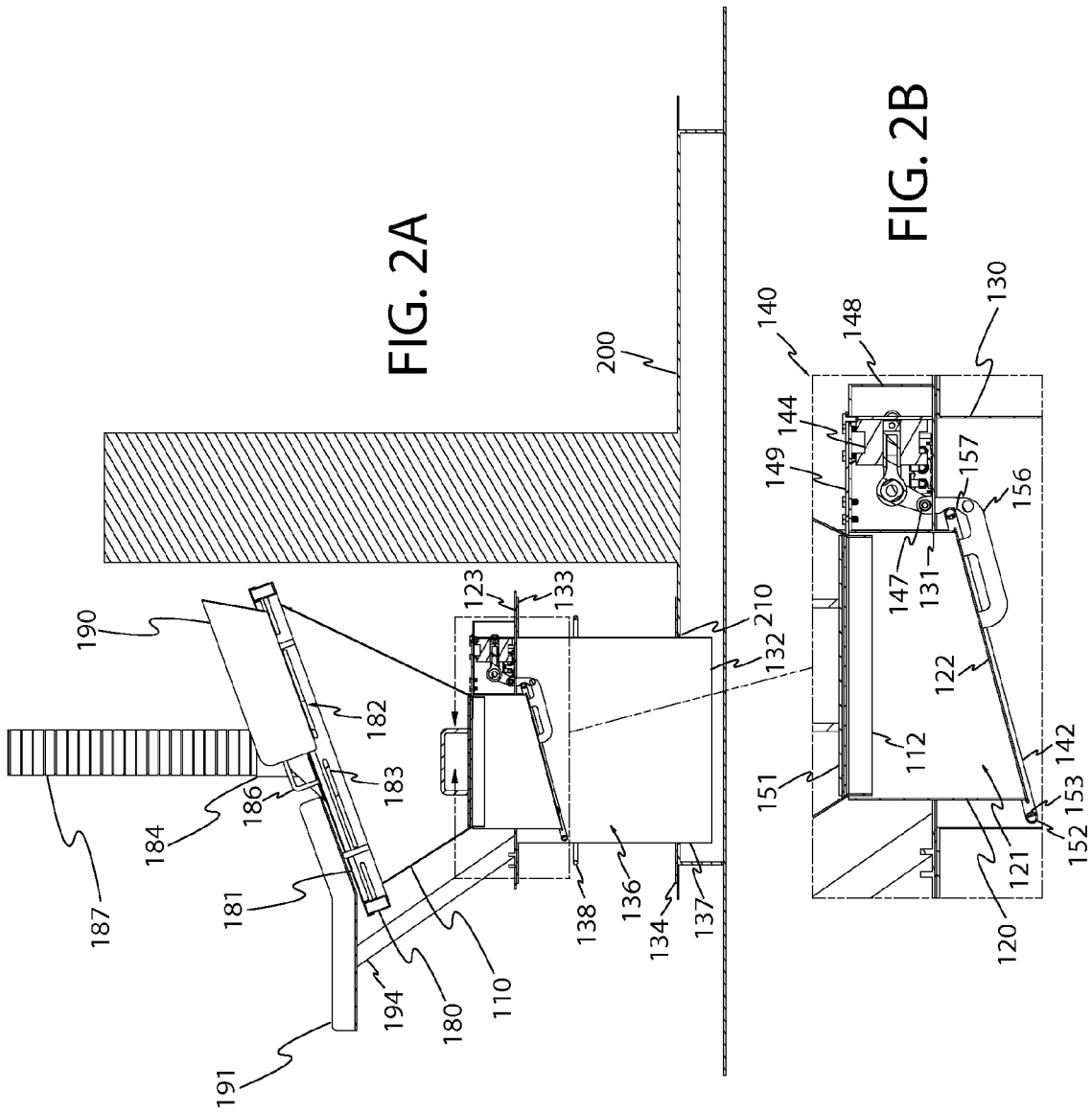

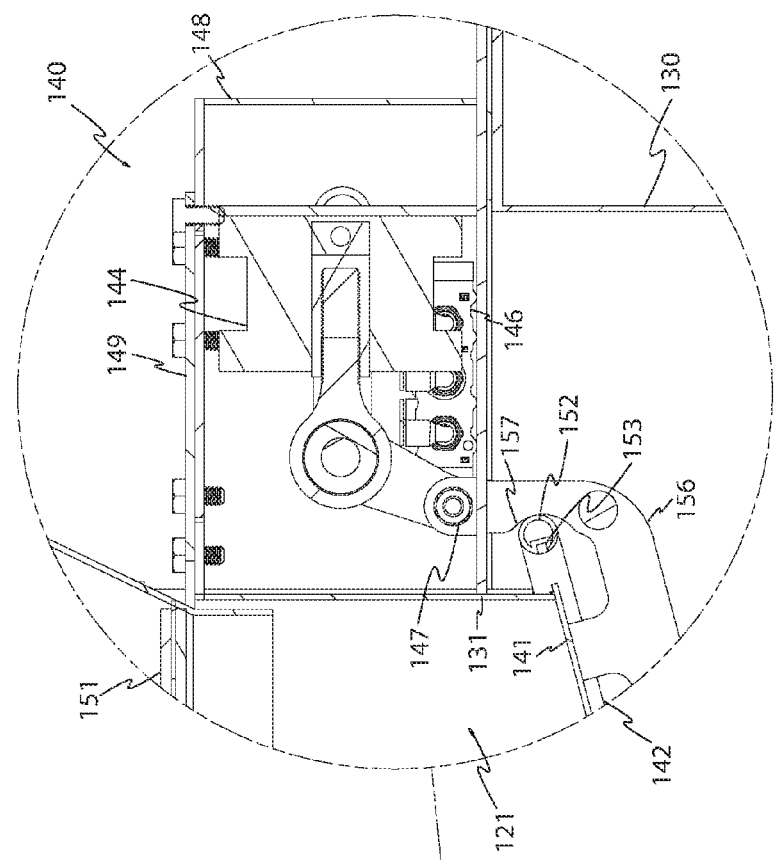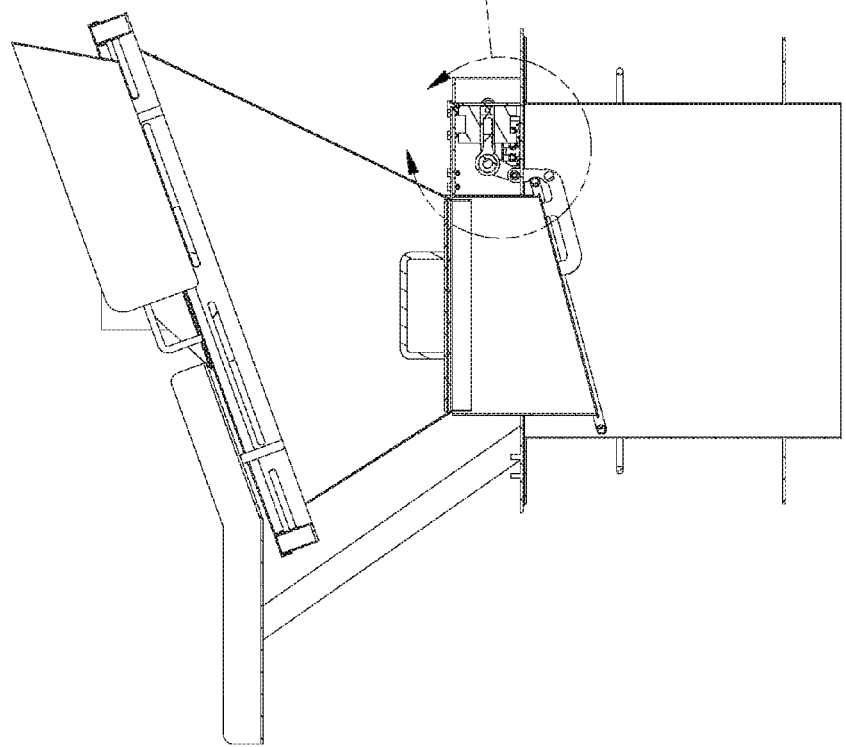
FIG. 2C

NITROGEN PURGE HOPPER

CROSS-REFERENCE TO RELATED APPLICATIONS

The present application claims the benefit of U.S. Provisional Patent Application No. 61/730,960, filed Mar. 15, 2013, the content of which is hereby incorporated by reference in its entirety.

BACKGROUND OF THE INVENTION

In the manufacturing of chemical compounds and substances, including the pharmaceuticals industry, solid materials are routinely transferred from storage containers, such as drums and bags, into vessels where the materials undergo processing, such as mechanical mixing and chemical reactions under a variety of conditions. The manual conveyance of such solid materials from containers into process vessels is generally referred as charging.

The charging process exposes the interior space of process vessels to oxygen-rich outside environments. The increase of the concentration of oxygen in a process vessel, mixed with flammable chemical matter emitting dust and vapors, poses a risk of fire or explosions. Process vessels may be equipped with mechanical equipment for purging the interior space of the process vessel, referring to the addition of an inert gas—most commonly nitrogen—to lower the oxygen concentration of the interior space and render it non-ignitable.

Conversely, the charging process also exposes the outside environment to dust and vapors are emitted from the process vessel. In the process of conveying solid materials into the vessel, dust and vapors may also be sent airborne while chemical matter is evacuated from containers and falls into the vessel. This may, in turn, lower the oxygen concentration outside of the vessel, particularly in the vicinity of the opening of the vessel, thus posing a risk to human operators working closely to the opening.

BRIEF SUMMARY OF THE INVENTION

According to embodiments of the present invention, a hopper apparatus provides a conveyance passage equipped with a nitrogen purge system, including a flap valve and a nitrogen injection line. In operation, the hopper apparatus is installed over an opening of a process vessel. Chemical matter may be conveyed through the conveyance passage to land within the process vessel. As chemical matter falls through the conveyance passage, the flap valve and the nitrogen injection line may be operated in conjunction to inject nitrogen into the falling stream of chemical matter, reducing the oxygen concentration within the falling stream.

According to embodiments of the present invention, a hopper apparatus further provides ventilation slots connected through exhaust ports at an upper mouth of a receptacle of the hopper apparatus. While chemical matter is conveyed through the hopper apparatus, airborne dust and vapor from the falling stream of chemical matter may be extracted from the breathing zone of the hopper apparatus by an HVAC system through the ventilation slots and exhaust ports. Ventilation and extraction reduce the risk of elevated nitrogen concentrations from reaching the breathing zone of the hopper apparatus for a human operator, and prevents the depletion of oxygen concentrations in the breathing zone.

BRIEF DESCRIPTION OF THE DRAWINGS

FIG. 1 illustrates an exploded view of a hopper apparatus according to an embodiment of the present invention.

FIG. 2A illustrates a sectional view of a hopper assembled in conjunction with a process vessel according to an embodiment of the present invention, and FIGS. 2B through 2D illustrate partial views of sectional views of a hopper assembled in conjunction with a process vessel, focusing on a purge assembly of the hopper.

DETAILED DESCRIPTION OF THE INVENTION

Figure 2D:
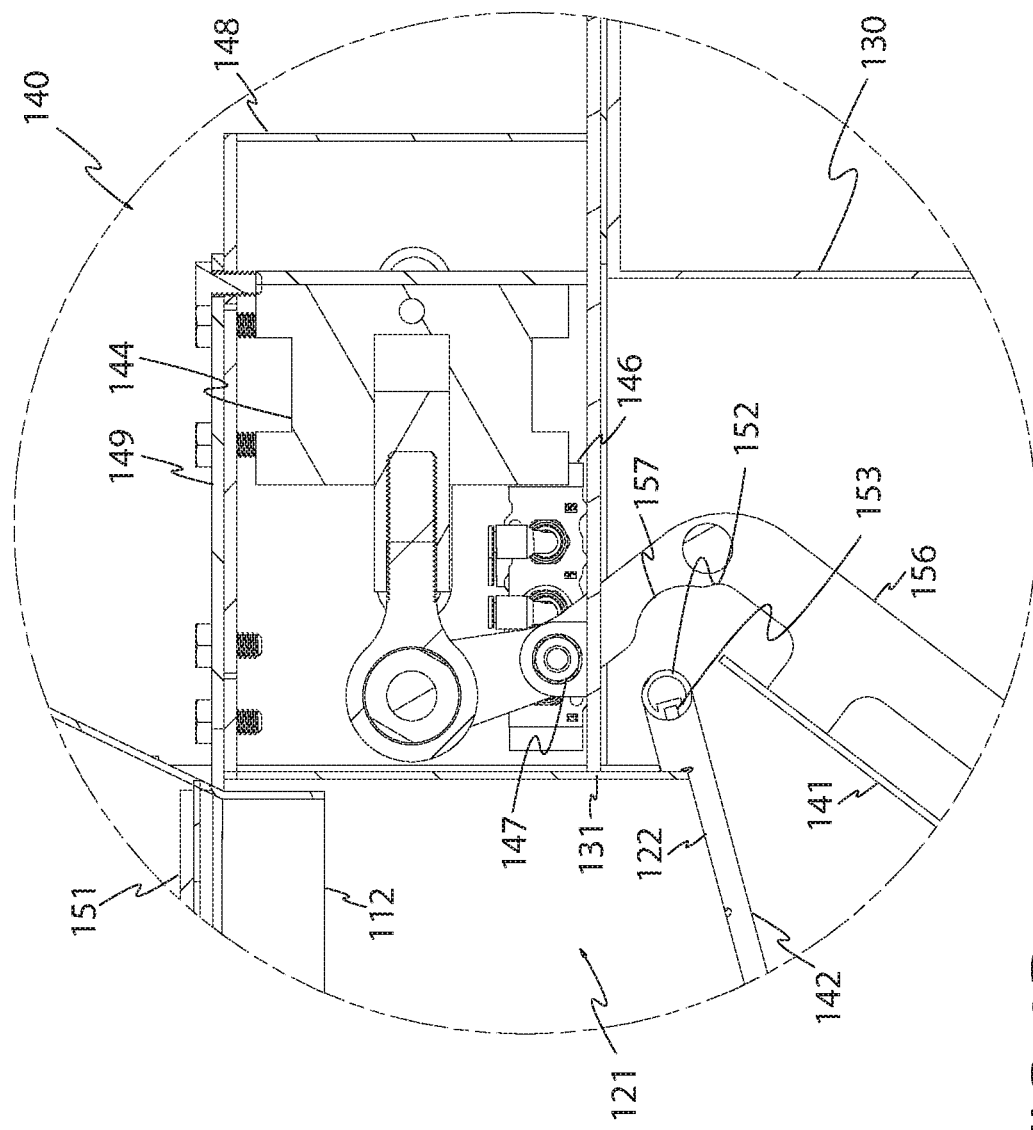

Embodiments of the present invention provide a hopper apparatus that incorporates a nitrogen injection line operable to limit the concentration of oxygen introduced into a process vessel during the manual conveyance of solids (typically dry) by a nitrogen purging process. Embodiments of the present invention further provide a hopper apparatus that provides localized dust and vapor collection at the manway region of a process vessel, which may prevent dust and vapors from reaching the outside environment through the manway, and may prevent oxygen levels from being depleted in the breathing zone of the hopper apparatus while in use by a human operator.

FIG. 1 illustrates an exploded view of a hopper apparatus 100 according to an embodiment of the present invention. The hopper apparatus 100 is composed of a receptacle member 110, a purge member 120, and an adapter 130.

A receptacle member 110 according to embodiments of the present invention has a mouth 111 and a base opening 112. The inner face of the receptacle member 110 forms a funnel 115 opening at the mouth 111 and at the base opening 112. Clamp receivers 113 are located on a side of the receptacle member 110. In embodiments of the present invention, the mouth 111 of the receptacle member 110 provides mounting tabs 114.

A purge member 120 according to embodiments of the present invention is composed of an upright tunnel 121 encircled by a platform 123. The tunnel 121 has an angled lower mouth 122. The platform 123 has a midsection clamp slot 125 through a portion of the outer rim of the platform 123.

An adapter 130 according to embodiments of the present invention has an upper opening 131 and a lower opening 132 encircled by a lower skirt 137. The upper opening 131 is encircled by an upper support ring 133. The lower opening 132 is encircled by a lower support ring 134. The upper support ring 133 has a bottom clamp slot 135 through a portion of the width of the upper support ring 133. The adapter 130 is further provided with a clamp 139 fastened to a side of the exterior of the adapter 130.

Embodiments of the present invention further provide the receptacle member 110 with a ventilation sleeve 180, a backsplash 190, and a landing table 191. A ventilation sleeve 180 according to embodiments of the present invention is composed of an annular frame 181 housing a flow chamber 182 opening through a set of ventilation slots 183 and an exhaust port 184, and may further include draw latches 185 and upper handles 186.

Embodiments of the present invention further provide the purge member 120 with a purge assembly 140, landing table lower receivers 124, and midsection handles 126. The purge assembly 140, the landing table lower receivers 124, and the midsection handles 126 may each be attached to the platform 123. A purge assembly 140 according to embodiments of the present invention provides a flap valve 141, an annular ring 142, gas feed ports 143, an actuator 144, an access port 145, and a pneumatic control valve. The actuator 144 may be housed within a housing 148 having an access panel 149.

Embodiments of the present invention further provide the adapter 130 with lower handles 138 and a clamp 139.

FIG. 2A illustrates a sectional view of a hopper apparatus 100 assembled in conjunction with a process vessel 200 according to an embodiment of the present invention. A process vessel 200 in accordance with embodiments of the present invention may be any vessel applicable to industrial chemical reactions known to persons of ordinary skill in the art. Interior spaces of process vessels in accordance with embodiments of the present invention have volumes in the order of magnitude of approximately 2000 liters. Such vessels may be formed from stainless steel, and the interior spaces of such vessels may be lined with glass. In operation, a process vessel 200 may hold solid and liquid contents within the interior space of the process vessel 200, and a portion of the interior space above the solid and liquid contents defines a headspace. Vapor may emanate from solid and liquid contents contained within a process vessel. A portion of the headspace containing high levels of dense vapor defines a vapor space.

A top portion of the process vessel 200 defines a vessel dome. A circular or elliptical tubular opening protruding from the vessel dome defines a manway. A manway provides access to the interior space of the process vessel 200 for charging of substances into the interior space in high volumes, and may be secured by a detachable lid. A process vessel 200 may be provided with further smaller tubular openings protruding from the vessel dome defining nozzles. A nozzle provides access to the interior space of the process vessel 200 that may be used to add chemical matter to the interior space, insert electronic sensors into the interior space, or vent the interior space to the external atmosphere of the process vessel 200. According to embodiments of the present invention, the hopper apparatus 100 may be installed over the opening of a manway or over the opening of a nozzle. The installation of the hopper apparatus 100 over the opening of a manway 210 is described herein as a non-limiting example.

The lower skirt 137 of the adapter 130 may insert into the opening of the manway 210, with the lower support ring 134 resting on the upper-facing surface of the process vessel 200, to mount the adapter 130 onto the manway 210. The lower mouth 122 of the purge member 120 inserts into the upper opening 131 of the adapter 130, with the platform 123 resting on the upper support ring 133, to mount the purge member 120 onto the adapter 130. The base opening 112 of the receptacle member 110 inserts into the tunnel 121 of the purge member 120 to mount the receptacle member 110 onto the purge member 120.

In assembly, from top to bottom, the receptacle member 110, the purge member 120, and the adapter 130 are mutually engaged in a column to form an upright conveyance passage 150 opening at the mouth 111 of the receptacle member 110, and feeding into the manway 210 through the lower opening 132 of the adapter 130. In this assembled configuration, the lower support ring 134 supports the weight of the hopper apparatus 100. The height of each element of the hopper apparatus 100 may be designed to match the height of the hopper apparatus 100 to the height of a dump station as known by persons of ordinary skill in the art, to facilitate conveyance of chemical matter from a supply container into the hopper apparatus 100.

A ventilation duct 187 is connected to the exhaust port 184 of the ventilation sleeve 180. The ventilation duct 187 may be connected to an HVAC system as known to persons of ordinary skill in the art.

The conveyance passage 150 may be closed by inserting a cover 151 into the receptacle member 110. A cover 151 according to embodiments of the present invention may be a removable disc having a silicon gasket providing a seal around the perimeter of the cover 151. The conveyance passage 150 may further be closed by the operation of the flap valve 141, as described below in further detail. Furthermore, the conveyance passage 150 may be obstructed by placing crossbars in the mouth 111, to block large objects such as bags from falling through the conveyance passage 150 and into the process vessel 200. Crossbars according to embodiments of the present invention may be composed of a first set of one or more constituent bars oriented in a first direction at a first elevation, and a second set of one or more constituent bars oriented in a second direction intersecting the first set of constituent bars at a second elevation. Constituent bars may vary in thickness and patterns of intersection.

The elements of the hopper apparatus 100, including the receptacle member 110, the purge member 120, and the adapter 130 and their constituent elements, may be constructed from various grades of stainless steel. The flap valve 141, in particular, may be constructed from various grades of stainless steel or engineered corrosion resistant, statically conductive, materials as known to persons of ordinary skill in the art.

FIG. 2B illustrates a sectional view of the elevation view of the hopper apparatus 100 of FIG. 2A focusing on the purge assembly 140. The lower mouth 122 of the purge member 120 is encircled by the annular ring 142. The interior space of the annular ring 142 defines an injection ring 152. The inward-facing circumferential wall of the annular ring 142 is perforated about substantially the span of the circumference of the annular ring 142, forming a plurality of injection jets 153 accessing the injection ring 152. The injection jets 153 may be configured having particular configurations of numbers, patterns, and orientation angles relative to the conveyance passage. Particular configurations of injection jets may be designed to control pressure and flow of jets of nitrogen to penetrate the stream of chemical matter as it passes through the purge chamber 136.

The annular ring 142 is connected to the gas feed ports 143. The flap valve 141 and the actuator 144 are pivotably attached to each other about a hinge 147. The actuator 144 is configured to pivot the flap valve 141 about the hinge 147 such that the flap valve 141 is pivoted between a position closing the lower mouth 122 and a position opening the lower mouth 122.

The interior of the annular ring 142 forms a nitrogen injection line connecting the injection jets 153 with the gas feed ports 143. A nitrogen supply may be connected to the gas feed ports 143 to provide a nitrogen feed source. The gas feed ports 143 may include a bleed port and an injection port. A nitrogen control valve 146 is in connection with a portion of the nitrogen injection line running through the injection port, the nitrogen control valve 146 having at least two positions, including an open position and a closed position. In operation, nitrogen may be drawn from a nitrogen supply through the gas feed ports 143, and forced through the nitrogen control valve 146 to the injection jets 153 of the annular ring 142. Nitrogen is thus injected through the injection jets into the lower mouth 122 of the purge member 120 from substantially the circumference of the lower mouth 122 from the encircling annular ring 142.

The nitrogen control valve 146 may be connected to a valve lever 154 by a conduit 155, where the valve lever 154 is operable to open and close the nitrogen control valve 146. While the nitrogen control valve 146 is closed, nitrogen is injected from the nitrogen supply to the injection jets 153 through the bleed port, but not through the injection port. The bleed port is configured to limit the rate of nitrogen injection to the injection jets 153 to a first volumetric flow rate. While the nitrogen control valve 146 is opened, nitrogen is injected from the nitrogen supply to the injection jets 153 both through the bleed port and through the injection port. While the nitrogen control valve 146 is opened, the injection port allows the rate of nitrogen injection to the injection jets 153 to reach a second volumetric flow rate higher than the first volumetric flow rate.

FIGS. 2C and 2D illustrate sectional views of the elevation view of the hopper apparatus 100 of FIG. 2A focusing on the purge assembly 140 with the flap valve 141 in a closed position and an open position, respectively. The actuator 144 as illustrated in FIGS. 2C and 2D is a cylinder joined to the flap valve 141 by a lever arm 156 pivoting about the hinge 147. In FIG. 2C, the actuator 144 is in a compressed configuration, pivoting the flap valve 141 against the lower mouth 122 in a closed position by rotation of the lever arm 156. In FIG. 2D, the actuator 144 is in an extended configuration, pivoting the lever arm 156 about the hinge 147, pivoting the flap valve 141 away from the lower mouth 122 to an open position by rotation of the lever arm 156. A lever arm 156 according to embodiments of the present invention as illustrated in FIGS. 2C and 2D has a notch 157 along the length of the lever arm 156. While the flap valve 141 is in a closed position, the annular ring 142 fits into the notch 157, preventing the contact between the annular ring 142 and the lever arm 156 from obstructing the movement of the flap valve 141 into the closed position.

The actuator 144 is controlled by a pneumatic control valve connected to the actuator 144 by a pneumatic line. The pneumatic control valve may be connected to the valve lever 154 through the conduit 155 where the valve lever 154 is operable to open and close the pneumatic control valve. While opened, the pneumatic control valve may apply force to the actuator 144 to place the actuator 144 in an extended configuration, pivoting the flap valve 141 to an open position.

Figure 3A:
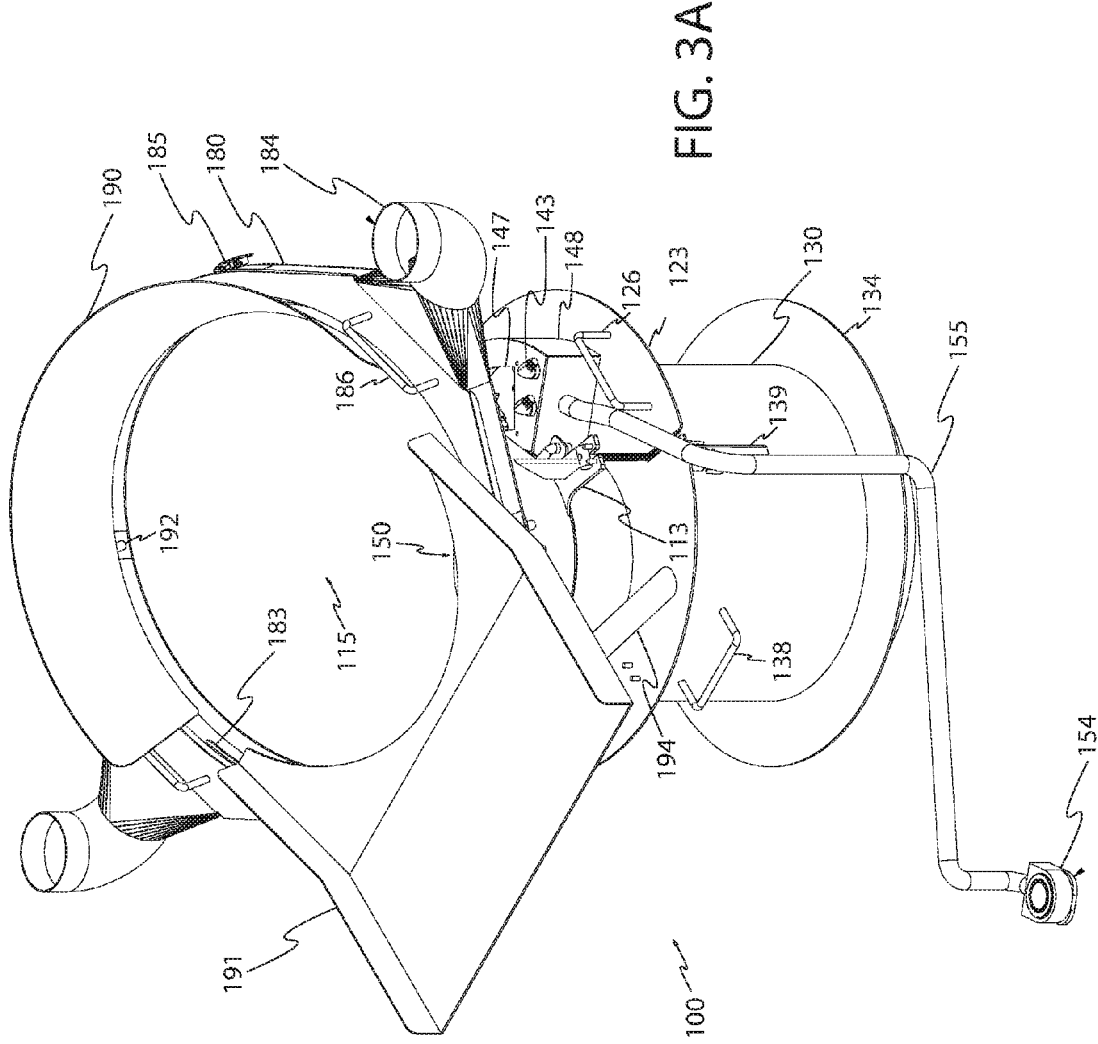
FIGS. 3A, 3B, and 3C illustrate perspective views of the hopper in assembly with a ventilation sleeve, a backsplash, and a landing table.
Figure 3B:
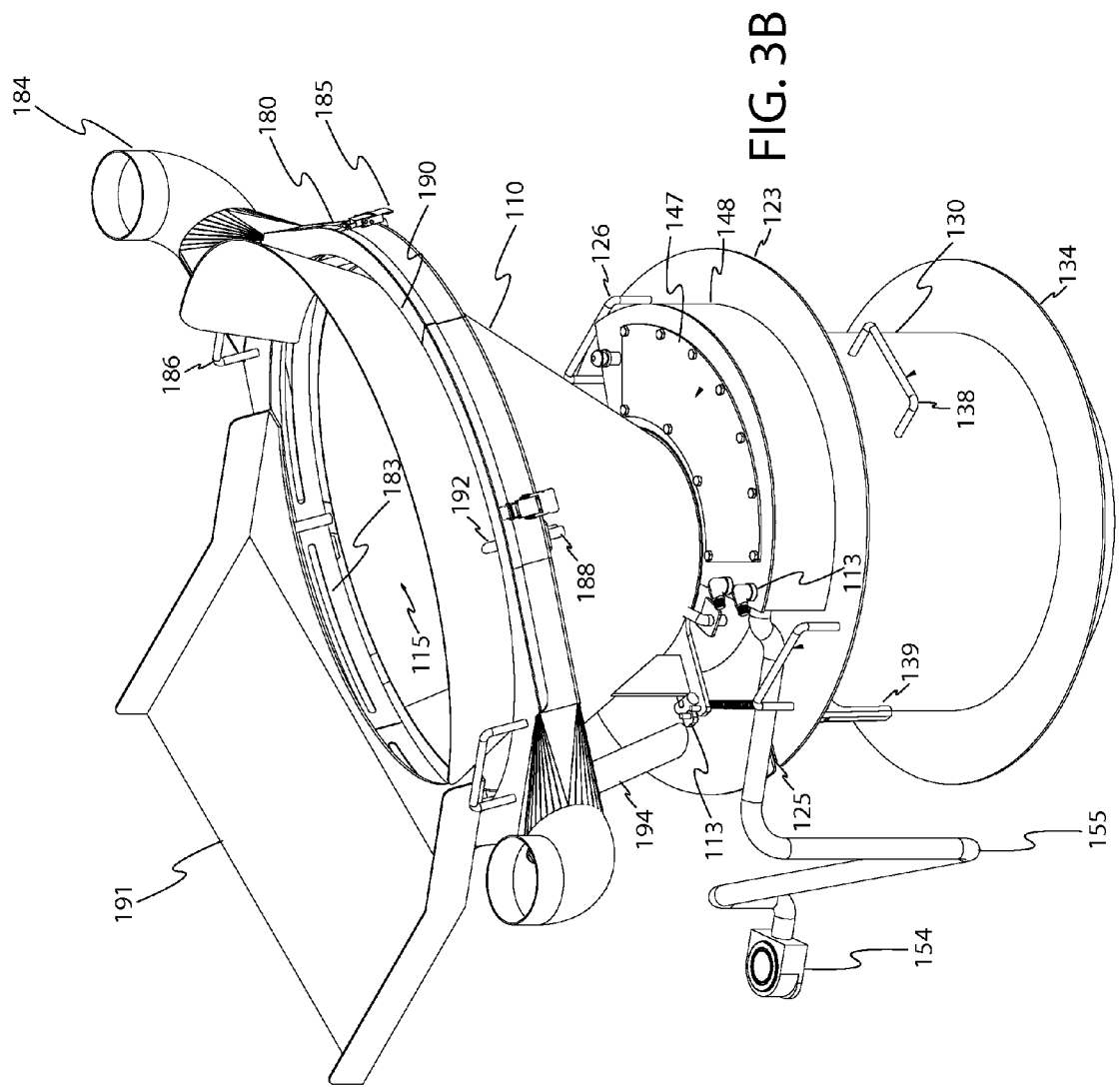

In embodiments of the present invention as illustrated in FIGS. 3A and 3B, the valve lever 154 is a pedal and may be operated by a human operator by hand or foot.

In further embodiments of the present invention, the pneumatic control valve may be opened and closed in accordance with a time delay by a timer in mechanical connection with the pneumatic control valve, such as a pneumatic timer as known to persons of ordinary skill in the art. In further embodiments of the present invention, the pneumatic control valve may be opened and closed in accordance with feedback signals from an electronic controller in electronic connection with the pneumatic control valve. An electronic controller in accordance with embodiments of the present invention may be a programmable logic controller in electronic connection with a chemical sensor. The chemical sensor may be positioned in the vapor space of the process vessel 200 and may be sensitive to concentrations of chemical vapors present within the vapor space.

The flap valve 141 may be further provided with a non-powered retract mechanism, such as a spring retract or a counterweight. The flap valve 141 may be biased by the non-powered retract mechanism to pivot to the closed position while the pneumatic control valve is closed, resetting the actuator 144 to a compressed configuration. The non-powered retract mechanism may reduce the risk of hand injury posed by the pivoting of the flap valve 141 to a closed position.

The hopper apparatus 100 assembled in conjunction with a process vessel 200 in accordance with FIG. 2A provides a purge chamber 136 defined by the closure of the platform 123 over the upper opening of the adapter 130. The installation of the adapter 130 over the manway 210 creates a continuous space between the purge chamber 136 and the headspace of the process vessel 200. While the flap valve 141 is in an open position, the funnel 115 and the tunnel 121 channel materials into the interior space of the process vessel 200 through the purge chamber 136 and the manway 210. While the flap valve 141 is in a closed position, access to the process vessel 200 through the purge chamber 136 is blocked.

Figure 3C:
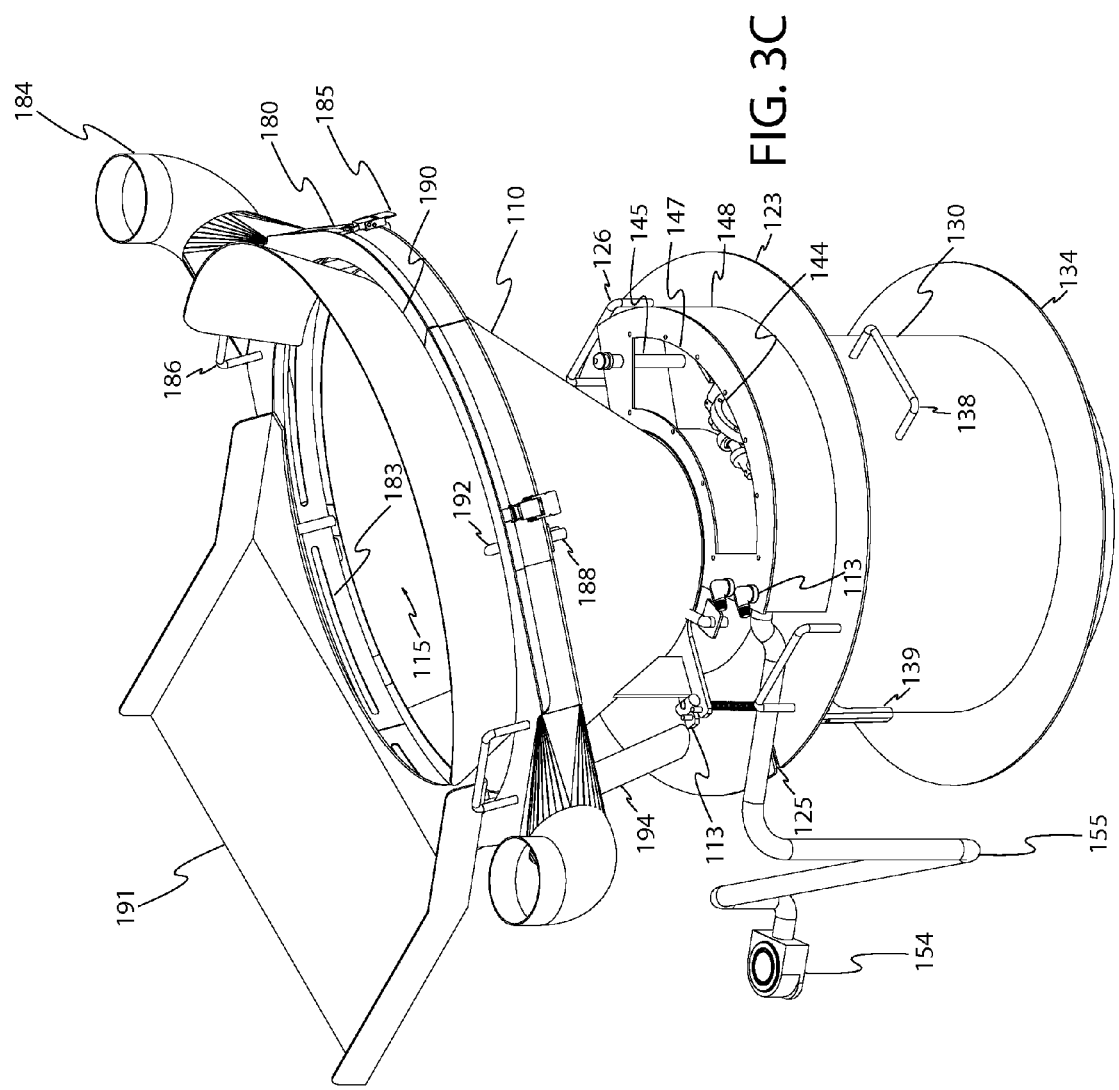
Figure 5:
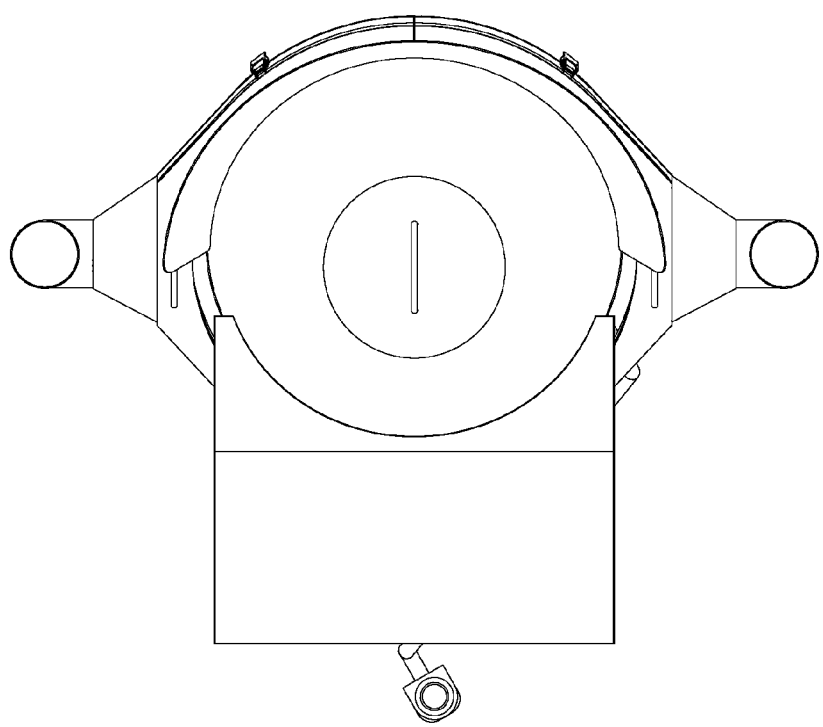
FIG. 5 illustrates a plan view of a hopper according to an embodiment of the present invention.

FIGS. 3A, 3B, and 3C illustrate perspective views of the hopper apparatus 100 in assembly with a ventilation sleeve 180, a backsplash 190, and a landing table 191. The ventilation sleeve 180 provides an annular frame 181 housing a flow chamber 182 connected to an exhaust port 184. According to embodiments of the present invention, the flow chamber 182 may be connected to more than one exhaust port. The annular frame 181 is detachably mounted to the mouth 111 of the receptacle member 110 by draw latches 185 positioned around the outer circumference of the annular frame. Draw latches 185 are fastenable to the mounting tabs 114 of the receptacle member 110. The annular frame 181 may be provided with upper handles 186 attached to the upper face of the annular frame.

The inward-facing circumferential wall of the annular frame 181 is perforated substantially about the circumference of the annular frame 181 with ventilation slots 183. Ventilation slots 183 access the flow chamber 182 in connection with exhaust ports 184. According to embodiments of the present invention, the annular frame 181 may encircle a full perimeter or a partial perimeter of the mouth 111, providing full or partial ventilation coverage.

A backsplash 190 according to embodiments of the present invention is a curved wall circling a portion of the mouth 111 of the receptacle member 110. The backsplash 190 is detachably mounted to the mouth 111 of the receptacle member 110 by backsplash supports 192 inserting into backsplash receivers 188 positioned around the circumference of the annular frame 181. The backsplash 190 may provide a wall shielding chemical matter conveyed into the hopper from splashing out of the mouth 111.

A landing table 191 according to embodiments of the present invention provides a platform overhanging outward from a side of the mouth 111 of the receptacle member 110. The landing table 191 is detachably mounted to the mouth 111 of the receptacle member 110 by landing table upper supports 193 of the landing table 191 inserting into landing table upper receivers 189 positioned around the circumference of the annular frame. The landing table 191 is further detachably mounted to the purge member 120 by landing table lower supports 194 of the landing table 191 mounting onto landing table lower receivers 142 of the purge member 120. A landing table 191 may provide an ergonomic platform to place a source container in preparation for the conveyance process.

FIGS. 3A, 3B, and 3C further illustrate perspective views of the clamp 139 in operation to secure the elements of the hopper apparatus 100. The clamp 139 is anchored to the adapter 130 by a reeled cable. In assembly, the clamp receivers 113, the midsection clamp slot 125, the bottom clamp slot 135, and the clamp 139 are aligned on a common axis. The cable may be extended through the bottom clamp slot 135 and the midsection clamp slot 125 such that the clamp 139 reaches the clamp receivers 113. Securing the clamp 139 to the clamp receivers 113 secures the receptacle member 110, the purge member 120, and the adapter 130 together in a column. The insertion of the cable through the bottom clamp slot 135 and the midsection clamp slot 125 mutually secures the lateral orientations of the receptacle member 110, the purge member 120, and the adapter 130.

FIGS. 3B and 3C further illustrate perspective views of the access panel 149. FIG. 3B illustrates the access panel 149 in a closed position. FIG. 3C illustrates the access panel 149 in an open position, providing access to the actuator 144.

Embodiments of the present invention may further provide an oxygen analyzer in conjunction with an oxygen sensor, as known to persons of ordinary skill in the art, to monitor the oxygen concentration surrounding the hopper apparatus 100. An access port 145 according to embodiments of the present invention provides a port opening above the purge member 120 and miming through the purge chamber 136 accessing the vapor space. An oxygen sensor may be inserted into the access port 145 to detect an oxygen concentration within the purge chamber 136 or an oxygen concentration within the process vessel 200. An oxygen sensor may also be placed at the mouth 111 of the receptacle member 110 to detect an oxygen concentration within the breathing zone of the hopper apparatus 100.

Further embodiments of the present invention provide a transport cart or cleaning stand. A transport cart or cleaning stand may provide a conveying mechanism for cleaning, transport, and storage of the elements of the hopper apparatus 100 in a disassembled state.

Embodiments of the present invention may further provide a burst plate for pressure channeling in the event of deflagration.

The hopper apparatus 100 may be placed in operation in conjunction with a process vessel 200 for the application of nitrogen purging to chemical substances conveyed through the hopper apparatus 100 into the process vessel 200. Examples of the operation of the hopper apparatus 100 in accordance with embodiments of the present invention are given below.

First, the hopper apparatus 100 is assembled by mutually engaging the receptacle member 110, the purge member 120, and the adapter 130 in a column, wherein the lower support ring 134 supports the hopper apparatus 100 at the base of the column, to form a conveyance passage over a manway 210 of a process vessel 200. The clamp 139 is secured to the clamp receiver 113 to secure the receptacle member 110, the purge member 120, and the adapter 130 in a column. The ventilation sleeve 180 and the backsplash 190 may be detachably mounted to the mouth 111, and the landing table 191 may be detachably mounted to the mouth 111 and the purge member 120. Exhaust ports 184 of the ventilation sleeve 180 are connected to ventilation ducts connected to an HVAC system.

A nitrogen supply is connected to the gas feed ports 143, establishing a nitrogen injection line in connection with the annular ring 142. The valve lever 154 is connected to the nitrogen control valve 146 of the nitrogen injection line and is connected to the pneumatic control valve of the pneumatic line by the conduit 155. According to embodiments of the present invention, the valve lever 154 is operable to both open the nitrogen control valve 146 and open the pneumatic control valve.

An oxygen sensor may be inserted into the access port 145, and may be placed at the mouth 111.

Figure 4:
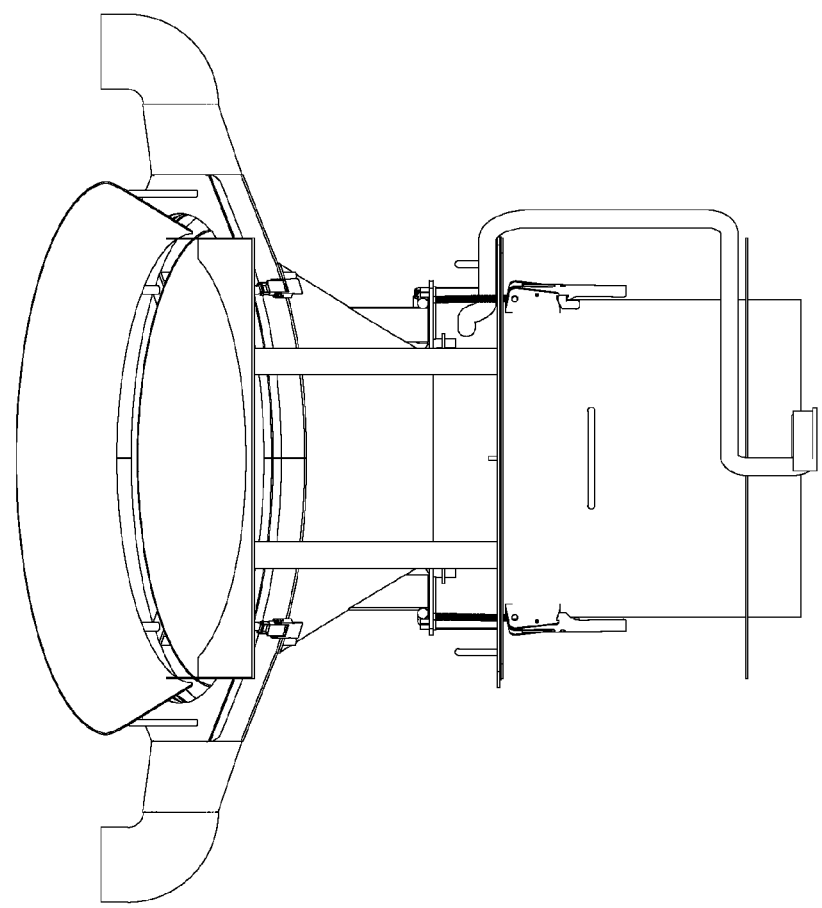
FIG. 4 illustrates an elevation view of a hopper from the perspective of a human operator accessing the hopper.

In operation, elements of the hopper apparatus 100 operable by a human operator may be like-oriented on a side of the hopper. For example, the landing table 191 and the valve lever 154 may be oriented on the same side of the hopper apparatus 100, where the landing table 191 overhangs a side of the mouth 111, and the valve lever 154 is a foot pedal positioned at the foot of the hopper apparatus 100 below the landing table 191. The conduit 155 may be a flexible stainless steel conduit, enabling the valve lever 154 to be placed in a variety of positions. Thus, a human operator accessing the hopper apparatus 100 may convey materials into the hopper apparatus 100 using the landing table 191, while operating the valve lever 154 by foot to open or close the nitrogen control valve 146 and the pneumatic control valve. FIG. 4 illustrates an elevation view of the hopper apparatus 100 from the perspective of a human operator accessing the hopper apparatus 100.

In operation, solid chemical matter from a variety of supply containers, such as drums, boxes, poly bags, paper bags, bulk bags, bulk containers, or bins, may be conveyed through the hopper apparatus 100 into a process vessel 200. A supply container may be lifted to the height of the mouth 111 and first rested on the landing table 191. Chemical matter from the supply container may then be discharged into the mouth 111, whereupon the funnel 115 channels the chemical matter into a falling stream through the tunnel 121. The dimensional parameters of the funnel 115 may be configured to different specifications to optimize the hopper apparatus 100 for a particular application.

During the conveyance of chemical matter, dust and vapors may be sent airborne from the falling stream of chemical matter into the breathing zone of the hopper apparatus 100. A breathing zone generally delineates the open-air space within and above the receptacle member 110, exposed to the inhalation of a human operator conveying materials into the hopper apparatus 100. The ventilation sleeve 180 provides localized ventilation of dust and vapors within the breathing zone within a partial or full perimeter of the mouth 111, depending on the positioning and coverage of the annular frame 181 around the perimeter of the mouth 111. Ventilated dust and vapors may be extracted through the flow chamber 182 and exhaust ports 184 by the HVAC system connection through ventilation ducts 187.

The angled lower mouth 122, flap valve 141, and annular ring 142 are situated within the purge chamber 136. While the valve lever 154 is not engaged, the flap valve 141 is closed while the annular ring 142 injects nitrogen into the purge chamber 136 at a first volumetric flow rate. This continual bleed of nitrogen establishes a background concentration of nitrogen within the purge chamber 136. While the flap valve 141 is closed, the falling stream of chemical matter collects within the tunnel 121 on the top side of the flap valve 141, and nitrogen does not escape the purge chamber 136 into the conveyance passage 150 above the lower mouth 122. By operating the valve lever 154, the flap valve 141 may be opened while the annular ring 142 injects nitrogen into the purge chamber 136 at a second volumetric flow rate. The opening of the flap valve 141 releases the collected chemical matter in the tunnel 121 to fall through the purge chamber 136 into the process vessel 200.

As the chemical matter falls through entrained air in the purge chamber 136, the purge chamber 136 isolates the falling stream through entrained air within a small space. The injection of nitrogen into the purge chamber 136 under the imposition of these conditions promotes the efficiency of the reduction of oxygen concentration within the falling stream of chemical matter within the short span of time that the stream passes through the atmosphere of the purge chamber 136. The injection of nitrogen under these conditions may also provide a force sufficient to remove particulate matter from the flap valve 141.

As a result, the concentration of nitrogen within the purge chamber 136 increases. The angle of the lower mouth 122, the flap valve 141, and the annular ring 142 furthermore serves to create an eduction effect on the falling stream and surrounding air, thereby reducing the risk of excess nitrogen within the purge chamber 136 escaping through the flap valve 141 and entering the breathing zone, and consequently presenting health risks to a human operator. The angle of the lower mouth 122, the flap valve 141, and the annular ring 142 is inclined downward towards the side of the hopper apparatus 100 faced by a human operator as illustrated in FIG. 4. According to embodiments of the present invention, the angle of the lower mouth 122, the flap valve 141 in the closed position, and the annular ring 142, may be 15 degrees from horizontal. Furthermore, the angle of the flap valve 141 in the open position is further inclined downward to promote the fall of chemical matter collected upon the flap valve 141. According to embodiments of the present invention, the angle of the flap valve 141 in the opened position may be 53 degrees from horizontal.

The height of the purge chamber 136 may provide a clearance to isolate the flap valve 141 from solvent vapors emitted from the process vessel 200, reducing the risk of solvent reactions with residual particulate that may be left by the falling stream on the walls of the tunnel 121 and on the flap valve 141. Embodiments of the present invention therefore provide an adapter 130 which nests with the purge member 120 such that the distance from the lower support ring 134 to the bottom edge of the flap valve 141 is sufficient to elevate the flap valve 141 away from vapor space in the process vessel 200. According to embodiments of the present invention, this distance may be 12.5 inches while the flap valve 141 is in a closed position and 6 inches while the flap valve 141 is in an opened position.

An oxygen sensor and an oxygen analyzer may be used in conjunction during the conveyance process to monitor oxygen concentrations within the hopper apparatus 100, within the process vessel 200, or within a breathing zone of a hopper apparatus 100 in operation by a human operator. An oxygen sensor may transmit electronic signals corresponding to an oxygen concentration to an oxygen analyzer having a monitor readable by a human operator, or may transmit electronic signals corresponding to an oxygen concentration to a mechanical or electronic controller. A human operator may make decisions as to the operation of the flap valve 141 depending on oxygen analyzer readings. An electronic controller such as a programmable logic controller may interpret signals transmitted from an oxygen sensor continuously, and may open or close the pneumatic control valve in accordance with the signals transmitted from the oxygen sensor.

After completion of the conveyance process, the hopper apparatus 100 while not in operation may be stored in an assembled configuration on the manway 210, and a cover 151 may be placed within the receptacle member 110 to prevent vapors from escaping. Alternately, the receptacle member 110, the purge member 120, and the adapter 130 may be stored in a disassembled configuration. Embodiments of the present invention may provide a mobile cart or a mobile stand configured to support or store one or more of the receptacle member 110, the purge member 120, and the adapter 130. A mobile cart or a mobile stand may be moved to transport the receptacle member 110, the purge member 120, or the adapter 130 between a storage location and a process vessel, and may elevate the receptacle member 110, the purge member 120, or the adapter 130 to provide manual access during cleaning procedures.

While particular elements, embodiments, and applications of the present invention have been shown and described, the invention is not limited thereto because modifications may be made by those skilled in the art, particularly in light of the foregoing teaching. It is therefore contemplated by the application to cover such modifications and incorporate those features which come within the spirit and scope of the invention.

What is claimed is:

1. A hopper apparatus 100, comprising:
 a receptacle member 110, a purge member 120, and an adapter 130 mutually engaged in a column;
 a conveyance passage 150 running through the receptacle member 110, the purge member 120, and the adapter 130;
 a tunnel 121 of the purge member 120 circumscribing the conveyance passage 150, wherein the tunnel 121 has a lower mouth 122 enclosed by the adapter 130;
 a pivotable flap valve 141 at the lower mouth 122;
 an annular ring 142 encircling the lower mouth 122 of the tunnel 121, the annular ring 142 being perforated with a plurality of inward-facing injection jets 153 about the circumference of the annular ring 142;
 gas feed ports 143 connected to the injection jets 153, the gas feed ports 143 including an injection port connected to a nitrogen control valve; and
 a valve lever 154 connected to the flap valve 141 and to the nitrogen control valve;
 wherein the top of the conveyance passage 150 opens at a mouth 111 of the receptacle member 110 and the bottom of the conveyance passage 150 opens at a lower opening 132 of the adapter 130;
 wherein the flap valve 141 is pivotable between a closed position and an opened position, wherein the flap valve 141 in the closed position obstructs the lower mouth 122 of the purge member 120;
 wherein the nitrogen control valve has a closed position and an opened position, wherein the nitrogen control valve in the closed position obstructs the connection between the injection jets 153 and the injection port; and
 wherein the valve lever 154 is operable to place the flap valve 141 in the opened position of the flap valve 141, and to place the nitrogen control valve in the opened position of the nitrogen control valve.

2. The hopper apparatus 100 of claim 1, wherein while the flap valve 141 is in the opened position of the flap valve 141, a non-powered retract mechanism biases the flap valve 141 towards the closed position of the flap valve 141.

3. The hopper apparatus 100 of claim 1, wherein the lower mouth 122, the flap valve 141, and the annular ring 142 are inclined downward on a side of the hopper apparatus.

4. The hopper apparatus 100 of claim 1, wherein the flap valve 141 is attached to a lever arm 156 having a notch 157;
 wherein the flap valve 141 pivots by rotation of the lever arm 156;
 wherein the annular ring 142 fits within the notch 157 while the flap valve 141 is in a closed position of the flap valve 141.

5. The hopper apparatus 100 of claim 1, further comprising a nitrogen supply connected to the gas feed ports 143;
- wherein while the nitrogen control valve is in the closed position of the nitrogen control valve, nitrogen flows from the nitrogen supply to the injection jets 153 at a first volumetric flow rate;
- wherein while the nitrogen control valve is in the open position of the nitrogen control valve, nitrogen flows from the nitrogen supply to the injection jets 153 at a second volumetric flow rate greater than the first volumetric flow rate.

6. The hopper apparatus 100 of claim 1, wherein the purge member 120 and the adapter 130 form a purge chamber 136;
- wherein while the flap valve 141 is in the closed position of the flap valve 141, nitrogen injected through the injection jets 153 into the purge chamber 136 is prevented from rising through the tunnel 121 by the flap valve 141;
- wherein while the flap valve 141 is in the open position of the flap valve 141, nitrogen injected through the injection jets 153 into the purge chamber 136 is prevented from rising through the tunnel 121 by an eduction effect generated by the flow of nitrogen at a second volumetric flow rate.

7. The hopper apparatus 100 of claim 1, further comprising a ventilation sleeve 180 mounted to the mouth 111, wherein the ventilation sleeve 180 encircles at least a portion of the perimeter of the mouth 111;
- wherein the ventilation sleeve 180 is perforated with a plurality of ventilation slots 183 about the circumference of the ventilation sleeve 180;
- wherein the ventilation slots 183 are connected to an exhaust port 184.

8. The hopper apparatus 100 of claim 1, wherein the receptacle member 110, the purge member 120, and the adapter 130 are secured together in a column by attaching a clamp 139 anchored to the adapter 130 to the receptacle member 110.

* * * * *